Figures 1, 2:
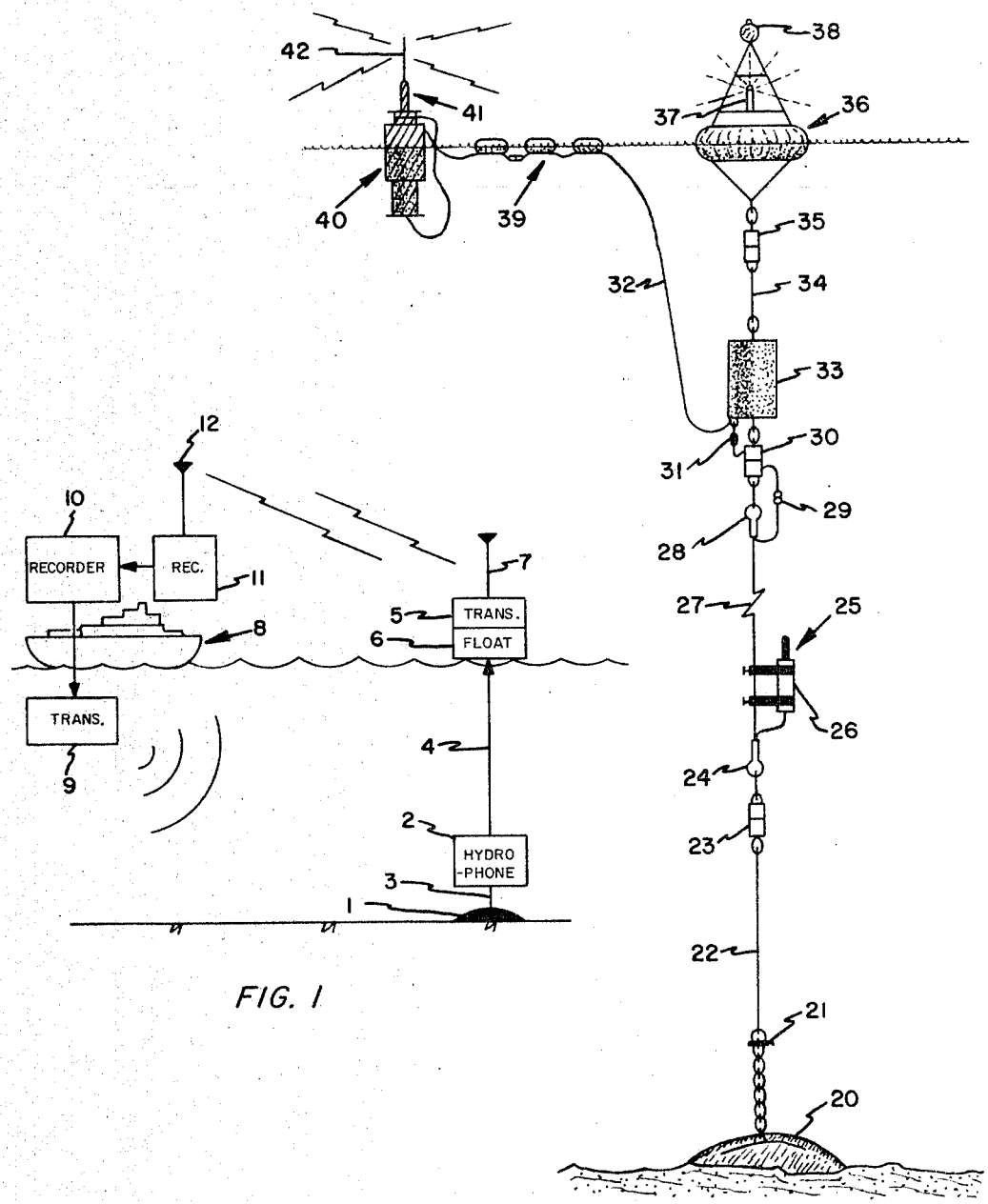

INVENTORS
JOHN B. HERSEY &
WILLARD DOW

United States Patent Office 3,299,398
Patented Jan. 17, 1967

3,299,398
DEEP WATER RADIO-ACOUSTIC BUOY
John B. Hersey and Willard Dow, Falmouth, Mass., assignors to the United States of America as represented by the Secretary of the Navy
Filed Jan. 14, 1965, Ser. No. 425,640
2 Claims. (Cl. 340—2)

The invention described herein may be manufactured and used by or for the U.S. Government for governmental purposes without the payment of any royalty thereon.

The present invention relates generally to position indicating systems and, more particularly, to a radio-acoustic buoy for marking a particular, deep water location.

In oceanographic research, marine seismology and underwater search operations, it is oftentimes necessary to carry out a detailed examination of a relatively small area of the ocean bottom in extremely deep waters. In order to probe the same site with different detecting apparatus, for example, consistent navigation of the survey vessel is required. However, most electromagnetic position indicating systems cannot be relied upon for the precise navigation needed to bring the vessel repeatedly over the location under investigation since their accuracy is not greater than one-eighth of a mile.

Likewise, attempts to navigate from anchored, taut wire buoys, equipped with such identification means as radar reflectors or transponders, have also not proved satisfactory in extremely deep locations. The reason for this is that the long length of the anchoring line allows these buoys to wander over a relatively large ocean expanse. Hence, depending upon wind and ocean current conditions, the surface position of these buoys may be fairly distant from the bottom site they presumably mark.

It is accordingly a primary object of the present invention to provide apparatus for permitting a surface vessel to locate a predesignated deep water location.

Another object of the present invention is to provide a radio-acoustic buoy for marking a deep underwater location.

A still further object of the present invention is to provide a navigation system which allows surface vessels to monitor their position with respect to a given bottom site located in extremely deep water.

A yet still further object of the present invention is to provide a radio-acoustic buoy which can be utilized in extremely deep waters wherein the reference element of the buoy remains relatively fixed.

A still further object of the present invention is to provide a buoy which is interrogated acoustically and answers automatically with an electromagnetic signal.

A yet still further object of the present invention is to provide a mooring arrangement for an underwater hydrophone which prolongs the life of the electrical cable used to relay its output signal to the surface.

Other objects, advantages and novel features of the invention will become apparent from the following detailed description of the invention when considered in conjunction with the accompanying drawings wherein:

FIG. 1 shows the general arrangement of the various components of the radio-acoustic buoy navigation system of the present invention; and FIG. 2 shows the details of the radio-acoustic buoy utilized in the system of FIG. 1.

Briefly and in somewhat general terms, the above objects of the present invention are realized by employing as the geographic reference element of the buoy a submerged hydrophone which is secured to a bottom anchor positioned at the location in question. This hydrophone, which is the pickup element of the buoy, is purposely positioned close to the ocean bottom. Hence, its movement is restricted to a relatively small circle centered about the anchor position. Because of its limited movement, the buoy for all practical purposes may be considered as being stationary and marking a predesignated bottom location.

Acoustic signals detected by this hydrophone are first preamplified locally, then relayed over a suitable electric cable to a radio transmitter located at the surface which broadcasts them omnidirectionally. By resorting to radio transmission to send out the buoy's response instead of simply having this buoy answer with an acoustical signal, the time required for a complete cycle of the system is cut in half. Also, any movement of the surface float which accommodates the radio transmitter is immaterial since it only influences the radio transmission path. This float, therefore, need not be moored in a taut manner and the difficulties attendant thereto are avoided.

In the operation of the present system, the survey ship simply echo ranges on the deep hydrophone, utilizing any conventional sound source. When these pulses reach the hydrophone, they are transmitted back to the ship almost instantaneously because of the radio link. In one embodiment of the invention, the recorder that displays the returning radio signals is also used to key the sound source. By this means, a synchronized record is obtained with the time lapse between a particular radiated sound pulse and the corresponding received radio pulse directly available on the recorder chart. Since this time lapse, which is essentially the ship-to-hydrophone acoustic travel time, represents the slant range to the site marked by the hydrophone, the survey ship can ascertain its distance from this site by simply observing the recorder chart.

Referring now to FIG. 1 of the drawings which shows the general nature of the over-all system, it will be seen that the radio-acoustic buoy includes an anchor 1 and a suspended sound detector or hydrophone 2 secured thereto at a location relatively close to the ocean bottom. Because of the relatively short length of mooring cable 3 employed between the anchor and the hydrophone, this hydrophone can move only through a relatively small circle centered with respect to the anchor. Hence, for all practical purposes, the hydrophone can be considered as marking a definite underwater location.

The signal output from hydrophone 2 after preamplification is relayed to the surface through a suitable underwater cable 4 and radiated as an electromagnetic signal from radio transmitter 5 built into surface float 6. An omnidirectional antenna can be affiliated with transmitter 5 for broadcasting the buoy's answer.

The search vessel 8 is provided with a sound transmitter 9 and, in one embodiment of this invention, this transmitter is periodically triggered by a signal originating at recorder 10. This recorder, for example, may be of the type wherein a sheet of treated paper passes between a rotating, helical timing element and a spaced, metallic strip, with the recording operation taking place in response to an electric discharge between a point along the timing element and this strip. To achieve a synchronous type of recording, the trigger pulse is sent to sound transmitter 9 at the start of each cycle of rotation of the recorder's timing element.

Vessel 8 also carries a conventional radio receiver 11 equipped with an omnidirectional antenna 12, and the output from this receiver is fed to recorder 10.

As vessel 8 proceeds towards the location marked by the radio buoy of the present invention, its sound pulses are picked up by hydrophone 2, and these pulses are recorded back at the vessel after a time lapse determined, for all practical purposes, solely by the slant range between transmitter 9 and the site in question, since the radio propagation time is negligible. Hence, the survey ship is continuously aware of its distance from the site under investigation.

Since the location of float 6, as mentioned hereinbefore, only influences the radio transmission path, this float can be permitted by the mooring scheme to move over any desired distance. Therefore, the electrical and mechanical cables used in the buoy can have whatever slack is deemed desirable to insure their prolonged life and operability. Moreover, the seamanship problems involved with a taut mooring system are avoided.

Referring now to FIG. 2, the radio-acoustic buoy is seen to include a hydrophone 25 and a battery-operated preamplifier 26 that is connected and attached by suitable clamps to a single-conductor logging cable 27. As mentioned hereinbefore, hydrophone 25 is suspended a relatively short distance above the ocean floor, and its movement in response to underwater currents is accordingly restricted to a small circle about the location in question. Electrical cable 27 terminates at each end in a banjo-type clamp 24 and 28, and these clamps are, in turn, mechanically connected to a pair of swivels 23 and 30. Swivel 30, the upper one, is of the slip-ring electrical type, and its bottom half is connected by a jumper cable and an in-line electrical connector 29 to the upper end of cable 27. Its upper half is connected by a jumper cable and an electrical connector 31 to a hydrophone cable 32. This cable is supported at one end by a subsurface float 33, and its other end is secured to a series of small surface floats 39 before it terminates at the input circuit of radio transmitter 41.

Swivel 30 is also mechanically fastened to subsurface float 33. This float, whose presence in the system protects cable 27, is suspended from a marker buoy 36. More particularly, float 33 is suspended from a Manila line 34 which terminates in a swivel 35 located at the end of a bridle. Fastened to lower swivel 23 is a length of line 22 to which is attached the bottom anchor 20 by means of a suitable cable connector 21.

The length of mooring line 22, as indicated hereinbefore, establishes the radius through which hydrophone 25 is permitted to move in response to ocean conditions. Therefore, this line should be kept as short as possible with due regard to the range at which it is desired to pick up this buoy. Hydrophone 25 should not be so close to the bottom as to be obscured or otherwise blocked by adjacent geographical formations.

It will be evident from an examination of FIG. 2 that the acoustic signals detected by hydrophone 25, after preamplification at 26, are sent through cables 27 and 32 to radio transmitter 41 and broadcasted omnidirectionally by antenna 42. For the reasons hereinbefore mentioned, float 40, which houses transmitter 41, can be allowed a reasonable degree of freedom in the mooring scheme since its location does not influence the accuracy of the system.

Subsurface float 33, together with swivels 30 and 23, it will be appreciated, keep electrical cable 27 taut, thus preventing any twisting or kinking thereof. Because of this, the operational life of the electrical cable is extended.

In order to permit the apparatus to be readily retrieved or its location otherwise identified by radar or visual means, marker buoy 36 is equipped with a flasher 37 and a tripod mast surmounted with a radar reflector 38.

It would also be pointed out in connection with the operation of the system that each of the transmitters can be designed to send out a coded answer in response to any acoustic interrogation signals. Thus, instead of merely relaying signals, each buoy can have a definite identification response. This is desirable where a multiplicity of buoys are being used in the same general location for defining a particular search grid.

Obviously many modifications and variations of the present invention are possible in the light of the above teachings. It is therefore to be understood that within the scope of the appended claims the invention may be practiced otherwise than as specifically described.

What is claimed is:
1. A radio-acoustic buoy for marking a predesignated bottom location in extremely deep water comprising, in combination,
   a subsurface float positioned above said location;
   a bottom anchor positioned at said predesignated bottom location;
   a first electric cable having a length sufficient to extend from said subsurface float to a short distance above the ocean bottom;
   means for connecting the upper end of said electric cable to said subsurface float and the lower end to said bottom anchor, said last-mentioned means including a pair of swivels for preventing twisting of said electric cable;
   a hydrophone supported near the lower end of said electric cable and electrically connected to that end of said electric cable;
   a surface float;
   a radio transmitter mounted in said surface float; and
   a second electric cable electrically connected to the upper end of said first electric cable and said radio transmitter whereby acoustic signals detected by said hydrophone are relayed over said first and second electric cables to said radio transmitter and then broadcast as radio signals.
2. In an arrangement as defined in claim 1,
   a surface buoy; and
   means for suspending said subsurface float from said surface buoy at a relatively shallow depth below said ocean surface.

References Cited by the Examiner

UNITED STATES PATENTS

| | | | |
|---|---|---|---|
| 2,422,337 | 6/1947 | Chilowsky | 340—2 |
| 2,716,758 | 9/1955 | Hajecate | 9—8 |
| 2,819,476 | 1/1958 | Dodge | 9—8 |
| 2,910,665 | 10/1959 | Hawkins | 340—2 |
| 2,982,940 | 5/1961 | Fryklund | 340—3 |

FOREIGN PATENTS 912,377  12/1962  Great Britain.

OTHER REFERENCES

Edgerton: Electronics, vol. 33, June 24, 1960, pp. 93–95 relied on.

Wiley: Electronics, vol. 34, Dec. 8, 1961, p. 28 relied on.

CHESTER L. JUSTUS, *Primary Examiner.*

R. A. FARLEY, *Assistant Examiner.*